United States Patent Office 3,730,904
Patented May 1, 1973

3,730,904
HALOGENATED HYDROCARBON COMPOSITIONS
AND USES THEREOF
John Joseph Clementson and Peter Graham Johnson, Runcorn, England, assignors to Imperial Chemical Industries Limited, London, England
No Drawing. Filed Apr. 17, 1970, Ser. No. 29,697
Claims priority, application Great Britain, Apr. 29, 1969, 21,814/69
Int. Cl. C09d 9/04; C11d 7/52; C23g 5/02
U.S. Cl. 252—171
13 Claims

ABSTRACT OF THE DISCLOSURE

A composition comprising a chlorohydrocarbon or bromohydrocarbon solvent and a sodium, ammonium or amine salt of the monosulphonic acid derivative of a diester of a succinic acid in an amount of at least 0.5% by weight of the composition.

---

This invention relates to halogenated hydrocarbon compositions and uses thereof, and particularly to compositions comprising chlorohydrocarbon solvents and use of such compositions for cleaning and for drying articles, for example machinery, instruments and other metal articles, plastic articles which are not affected by the solvents, for example polyamides, polypropylene and polytetrafluoroethylene, textile materials and glass articles generally.

It is well known that liquid halogenated hydrocarbons, especially chlorinated aliphatic hydrocarbons, have the property of dissolving grease and oils, and that they can be used to effect degreasing of metals and other articles. It is also well known that the chlorinated aliphatic hydrocarbons, especially trichloroethylene and perchloroethylene, can be used to dry metal and other articles since the boiling solvents have the property of removing water from articles in the form of a constant boiling mixture with the solvent. Trichloroethylene and perchloroethylene form constant boiling mixtures with water; that of trichloroethylene and water contains 13 parts by weight of trichloroethylene and 1 part by weight of water, and that of perchloroethylene and water contains 5 parts by weight of perchloroethylene and 1 part by weight of water.

In drying processes using these solvents, water can be removed simply by distillation since the constant boiling mixture boils at a temperature lower than the boiling point of the pure solvent. The resulting vapours are condensed and the condensate is passed to a water separator wherein the solvent is recovered for re-use. The method can be carried out efficiently in view of the appreciable water content of the azeotrope.

However, processes for drying articles using pure or conventionally stabilised trichloroethylene or perchloroethylene have the disadvantage that the surface of the articles tends to become stained due to in situ drying of water droplets. This effect is particularly noticeable in the drying of metal and glass articles. In order to overcome this disadvantage it is necessary that the water droplets be removed from the surface of the article and incorporated in the solvent prior to evaporation of the water.

Moreover, whilst the chlorinated hydrocarbon solvents, particularly trichloroethylene and perchloroethylene have the property of dissolving oils and greases they do not remove water-soluble contaminants. It is clearly desirable, therefore, to improve the cleaning properties of these solvents by using them in admixture with water, but a simple physical mixture of solvent and water is not effective as a cleaning agent.

We have found that the properties of the chlorinated hydrocarbon solvents can be modified to confer upon them the property of taking up water in the form of an emulsion of water in the solvent (a water-in-oil emulsion). The properties of the solvent are modified by incorporating therein at least 0.5% by weight of a metal, ammonium or amine salt of the monosulphonic acid derivative of a diester of a succinic acid. These salts are commonly known as salts of sulphosuccinic esters. We have found that these salts are efficient in enabling water to be emulsified in chlorinated hydrocarbon solvents, whereas the majority of non-ionic surface active agents or anionic surface active agents, for example the sodium salt of dodecyl benzene sulphonic acid, the petroleum sulphonic acids, alkylnaphthalene sulphonates, salts of fatty acids, or alkylphenol/alkylene oxide condensates do not have this property.

According to the present invention we provide a composition comprising a chlorohydrocarbon or bromohydrocarbon solvent and a metal, ammonium or amine salt of the monosulphonic acid derivative of a diester of a succinic acid in an amount of at least 0.5% by weight of the composition.

The salts which may be employed are the metal, ammonium and amine salts of sulphonic acids of formula

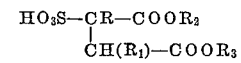

wherein R and $R_1$ may be the same or different and each represents a hydrogen atom or an alkyl or aryl group and $R_2$ and $R_3$ may be the same or different and each represents an alkyl, cycloaliphatic, aryl, alkaryl or aralkyl group containing from 4 to 13 carbon atoms and which may be substituted. We prefer to employ salts wherein R and $R_1$ each represents a hydrogen atom. Particularly good results have been obtained using salts of acids wherein each of the groups $R_2$ and $R_3$ is an amyl or a hexyl group (straight chain or branched chain) notably a methyl amyl group. We prefer to employ a salt which is soluble in the halogenated hydrocarbon solvent. Where the salt is a metal salt, the metal is preferably an alkali metal notably sodium.

A wide variety of amines may be used to form the salt of the sulphonic acid. Amines which can be used include the primary, secondary, tertiary alkyl amines or alkanolamines, aromatic amines, cyclic amines and heterocyclic compounds containing N as heteroatom.

Solutions of the salt in the solvent have the property of emulsifying water and forming a water-in-oil emulsion, the amount of water which can be emulsified in this way depending upon the amount of the additive incorporated and the particular solvent. For any particular concentration of the salt in the solvent, there is a maximum amount of water which can be emulsified to form a water-in-oil emulsion, but any composition which contains less than this maximum has the property of taking up and emulsifying more water and is therefore useful for drying articles. Other substances may be incorporated in the compositions instead of but preferably in addition to water. Examples of such other substances are ammonia, metal brightening agents, phosphoric acid, hydrochloric acid and metal chelating agents. The amount of such substances which can be tolerated in emulsions of water in the halogenated hydrocarbon solvent is limited by their causing phase separation of the emulsion when present in appreciable quantities. The maximum amount of the substance which can be tolerated depends upon the particular substance and can be determined by simple experiment.

The compositions of the invention which contain water, particularly those containing appreciable quantities of water as water-in-oil emulsions are useful as cleaning agents for articles immersed therein, particularly for freeing the articles from grease and oils, and also water-soluble contaminants.

According to a further feature of the invention, therefore, we provide a composition comprising a chlorohydrocarbon or bromohydrocarbon solvent, water and a metal, ammonium or amine salt of the monosulphonic acid derivative of a diester of a succinic acid in an amount of at least 0.5% by weight of the composition.

The compositions of the invention whether or not they contain water may contain a non-ionic surface active agent in addition to the salt of the sulphosuccinate. Suitable non-ionic surface active agents include for example condensates of alkylene oxides, notably ethylene oxide, with alkyl phenols, fatty alcohols, fatty amines or fatty amides. The proportion of the non-ionic surface active agent, if present, need not be more than five times the weight, and will usually be less than, the weight of the salt of the sulphonic acid. The proportions of the non-ionic surface active agent given above are intended merely as a general guide and it is to be understood that the optimum amount is different for different salts of the sulphonic acids. The amount is in fact important and should be maintained within fairly narrow limits for each particular salt used, and the optimum amount for each salt can be determined by simple experiment.

We have found that for practical cleaning purposes the amount of water which is emulsified in the solvent need not be greater than about 50% by weight of the resulting emulsion. In order to be capable of emulsifying this amount of water and forming a water-in-oil emulsion there is no advantage in using a total amount of surface active agent (i.e. the salt of a sulphonic acid and the non-ionic surface active agent, if present) greater than 10% by weight based on the weight of the emulsion.

We have found that relatively small amounts of the sulphosuccinate, for example 1.5% by weight, can enable the emulsification of large amounts of water, for example up to 50% by weight of the composition. The resulting emulsion may be clear or milky (cloudy) depending upon its water content, but the emulsions are useful for cleaning articles whether they are clear or milky.

The cleaning composition should contain at least 0.5% and preferably at least 1.0% by weight of water, and correspondingly the compositions should preferably contain at least the same amount of total surface active agent. For most practical cleaning operations we have found that a cleaning composition which contains about 6% by weight of the sulphosuccinate based on the emulsion is sufficient.

The compositions which are to be used as drying agents are preferably substantially free from water, although this is not essential providing they can emulsify additional water. The water-free composition should preferably be capable of emulsifying fairly large amounts of water and the amount of the salt (and the non-ionic agent if present) can be as described above in respect of cleaning agents.

The solvent constituent of the compositions can be any liquid chlorohydrocarbon or bromohydrocarbon solvent, especially a chloroaliphatic hydrocarbon for example trichloroethylene, perchloroethylene, 1,1,1-trichloroethane, beta-trichloroethane, cis and trans dichloroethylenes and methylene dichloride. Other solvents which may be employed are for example 2,3-dibromobutane, n-butyl bromide, chlorobromomethane and bromotrichloromethane.

We have found that only a limited amount of water-soluble material, e.g. electrolytes, can be incorporated in the emulsions since appreciable amounts of these cause a portion of the water to separate out into a distinct layer when the composition is allowed to stand, for instance overnight, without any form of agitation. If this phase separation occurs the separated water layer can be discharged and if appropriate fresh water can be added before the composition is re-used. Separation of the emulsions due to the presence of electrolytes is often an advantage since, after the separation, the electrolyte is present in the water layer and can be removed with that layer. Thus, for example, electrolytes entering the emulsions during cleaning of articles may cause separation of the emulsion during periods when the emulsion is not being used. Removal of the separated water layer, for example by skimming, thus removes the electrolytes from the treatment vessel and so risk of redeposition of the electrolytes on the article to be cleaned subsequently is reduced, thus enabling stain-free cleaning of articles to be achieved even if those articles are contaminated with metal salts and electrolytes. We prefer to use distilled or de-ionised water in the cleaning compositions of the invention.

Similarly in the drying of wet articles any electrolyte entering the composition together with appreciable amounts of water will cause the water to separate out when the composition is allowed to stand without agitation.

If required the compositions of the invention may contain one or more stabilisers. Stabilisation may be required against decomposition of the solvent induced by the presence of metals (especially aluminium and zinc) and heat and light. For example it may be necessary to stabilise the solvent to inhibit attack on metal articles being cleaned or drying and rinsing tanks. Any of the known stabilising additives for halogenated hydrocarbon solvents may be employed to prevent these decomposition reactions. Examples of such stabilising additives are nitroalkanes and other alkyl and aryl nitro-compounds, epoxides, amines for example triethylamine, alkanolamines, cyclic ethers, ketones, substituted phenols, pyrroles and certain alcohols such as propargyl alcohol which is advantageously used in conjunction with nitromethane for inhibiting corrosion of zinc. Usually the total amount of stabilisers added will not exceed 10% by weight of the composition since some additives may tend to cause separation of the water-in-oil emulsions into distinct layers if present in amounts of greater than 10% by weight. In addition to stabilisers, compounds known to inhibit tarnishing of copper and brass may be added.

Cleaning or drying of articles using the appropriate composition is carried out simply by immersing the articles in the composition for a suitable period of time, for example 60 seconds. The article is then removed and will generally be rinsed in a pure solvent (conveniently the same solvent as is used in the composition) to remove traces of the sulphonic acid salt or other additives which may have become deposited on the article. The cleaning composition can be used at its boiling point, thus producing sufficient agitation of the composition, both in the cleaning and in the rinsing treatments, but preferably lower temperatures, conveniently room temperature, are used in conjunction with ultrasonic agitation. Preferably, where the rinsing is carried out in cold solvent a further rinse in boiling solvent or in solvent vapour is carried out since this enables the solvent to evaporate quickly from the article after rinsing. Drying compositions will usually be used at the boil, but they can be used at lower temperatures in conjunction with ultrasonic agitation. After drying, the articles will be rinsed as described above.

The articles, after treatment to clean or dry them have surface active agent deposited on them. The deposit is removed in the rinse treatment. When the composition is used at the boil it is preferred to cause the rinse liquor (which is being continuously swelled by solvent from a condenser used to condense the vapours emitted as a result of boiling) to overflow into the cleaning or the drying composition. Any surface active agent in the rinse liquor is thus transferred to the cleaning or drying composition. Free water which forms when the solvent/water vapours are condensed, is separated in a water separator and passed automatically to a drain in the case of drying processes, and back to the tank containing the composition in the case where a composition containing water is being employed.

The water-free compositions and the emulsions of the invention are stable on storage and are often clear, colourless liquids even at the boil. They are prepared very easily by adding the salt of the sulphonic acid derivative (and also a non-ionic agent if desired) to the solvent and stirring the mixture to dissolve the salt. In the case of cleaning compositions water is then added with stirring. The water content of the compositions is very easily adjusted by adding water to increase the content or by stripping water from the composition, for example by distillation, or by adding an electrolyte followed by skimming off the resulting water layer, to decrease the water content. Normally, using a boiling composition to dry articles there will be little or no water in the composition after use unless a large batch of wet articles is dried immediately prior to switching off the heat supply to the drying bath.

The emulsions of the invention can be used to clean metal (though special additives may be necessary to prevent corrosion of the metal), insoluble plastics, glass, textile materials and other articles and the water-free compositions can be used to dry such articles. Cleaning results in the removal of grease and oil and water-soluble dirt. Drying results in the removal of water from the articles. The drying compositions are particularly useful for drying metal articles following electroplating processes.

The invention is illustrated but in no way limited by the following examples, wherein all parts and percentages are by weight unless otherwise stated.

EXAMPLE 1

5.5 parts of sodium di-methylamyl sulphosuccinate were added to 88.5 parts of a commercially available grade of trichloroethylene containing stabilisers and the mixture was agitated. Distilled water was then added and the mixture again agitated to form a water-in-oil emulsion, the amount of water being such as to give an emulsion containing 6% of water based on the total emulsion. The emulsion was then used to clean articles by the following procedure.

The emulsion is placed in a tank provided with means (e.g. a transducer) for ultrasonic agitation of the composition. Trichloroethylene (commercially available grade containing stabilisers) is poured into both compartments of a two-compartment tank which is separated from the tank containing the emulsion. In the two-compartment tank the compartments are in communication through a horizontal slit in their common wall. One of the compartments (the rinsing compartment) is provided with means (e.g. a transducer) for ultrasonic agitation of the solvent in the compartment, and the other (the vapour compartment) is provided with a heater to enable the solvent therein to be boiled. The vapour compartment is provided close to its upper end with cooling coils to condense the vapour emitted by the boiling solvent and to form a vapour zone above the surface of the boiling solvent. Pure solvent is poured into the vapour compartment to a level below the slit in the common wall, and in the rinsing compartment to a level such that a slight flow results through the slit into the vapour compartment. Means are provided for collecting the liquid solvent condensing from the cooling coils of the vapour compartment and passing this liquid solvent to the rinsing compartment.

The article to be cleaned is immersed for about 30 seconds in the water-in-oil emulsion which is ultrasonically agitated. The cleaned article is then immersed for about 30 seconds in the pure solvent which is ultrasonically agitated in the rinsing compartment. The article is then held for about 30 seconds in the vapour zone of the vapour compartment in which the solvent is boiling. The article is removed from the vapour and it dries rapidly.

By this procedure a wide variety of articles have been cleaned, including for example metal pressings and extrusions, wire drawing dies, spinnerettes, polished metals, silicon slices, lenses and microscope slides. In each case the cleaned articles were completely free from grease, oils and water-soluble dirt, and they were also free from drying stains.

EXAMPLE 2

A drying composition was prepared by adding 2.0 parts of sodium di-methylamyl sulphosuccinate to 98.0 parts of stabilised trichloroethylene and agitating the resulting mixture. The composition was then used to dry articles by the following procedure:

The composition is placed in one of the compartments of a two-compartment tank in which the compartments are in communication by a horizontal slit in the common wall. The upper level of the composition is below this slit and stabilised trichloroethylene is poured into the other compartment (the rinsing compartment) to a level such that a slight overflow results through the slit into the composition. The two compartments are provided with heating coils to enable the composition and the pure solvent to be boiled. Cooling coils are provided to condense vapours emitted from the compartments as a result of this boiling, means being provided for passing the total condensates (consisting of pure solvent initially but also water once a wet article has been introduced into the drying composition) to a water separator from which the pure solvent can be returned to the rinsing compartment.

Both the drying composition and the pure solvent in the rinsing compartment are boiled continuously and the wet article to be dried is immersed in the drying composition. The composition froths initially but the froth rapidly disperses. After a suitable period of time, usually about 30 seconds, the article is removed from the composition and is immediately immersed in the pure solvent in the rinsing compartment, again for a period of about 30 seconds. The dried article is then removed from the rinse liquor. During this drying procedure, condensed solvent is continuously introduced into the rinsing compartment from the water separator, and this causes the rinsing liquor, consisting essentially of pure solvent, to overflow through the slit into the drying composition. In this way any surface active agent which enters the rinsing compartment as a result of rinsing of the articles is gradually returned to the drying composition.

A variety of articles were each treated separately as follows. The article was held under a tap until it was thoroughly wet with water. The water on the article was usually in the form of droplets and/or a film, and articles of complicated shape contained water in holes and various undercut portions. The article was immersed in the boiling drying composition for a period of about 30 seconds and was then immersed in the rinsing compartment containing boiling rinsing liquor again for a period of 30 seconds. The drying ability of the composition was tested on a wide variety of articles, particularly on polished metals, lenses and microscope slides. In each case no traces of water were detectable on the treated articles. Moreover, the treated (dried) articles were free from staining.

During periods when the apparatus was not in use, the composition and the rinsing liquor were allowed to cool, and 2% by weight of water, based on the total composition was added to the drying composition which was then stirred until a homogeneous emulsion was formed. It was found that after drying articles which contained water to which an electrolyte had been added, a water layer had formed overnight on the surface of the composition. This layer was skimmed off prior to re-use of the composition and it was found that the composition continued to dry articles without causing staining.

EXAMPLE 3

The procedure of Example 2 was repeated except that perchloroethylene (98 parts) was employed instead of trichloroethylene.

The treated articles (polished metals, lenses and microscope slides) were free from staining and no traces of water could be detected on them.

The procedure described in Example 2 for eliminating electrolytes from the composition was successfully employed in the case of perchloroethylene composition.

EXAMPLE 4

The cleaning composition described in Example 1 was placed in one compartment of a tank and trichloroethylene (stabilised grade) was placed in two adjacent compartments of the tank, each compartment being provided with a heater so that the contents could be boiled.

The composition and the pure solvent in the adjacent compartments of the tank were heated to the boil, and glass lenses contaminated with grease, finger marks and general dust were immersed in the boiling composition for a period of 60 seconds after which they were withdrawn and immersed in the first tank of boiling solvent to rinse any surface active agent from the assemblies. Rinsing was for about 60 seconds, followed by a second rinse for about 60 seconds in the second tank of boiling solvent. On withdrawal from the second tank the lenses dried rapidly and were found to be free from contamination.

EXAMPLE 5

The procedure of Example 4 was repeated using instead of the trichloroethylene composition a composition of the formula:

|  | Parts |
|---|---|
| 1,1,1-trichloroethane (stabilised grade) | 96 |
| Sodium diamyl sulphosuccinate | 2 |
| Water | 2 |

The treated articles on withdrawal from the second tank were free from contamination and were dry.

EXAMPLES 6–7

These examples illustrate the formulations of water-in-oil emulsions useful for cleaning a variety of articles. In each example, the emulsion was found to be stable, even at the boil, and was clear and colourless. The solvent in each case was a commercially available stabilised grade of trichloroethylene.

EXAMPLE 6

|  | Parts by weight |
|---|---|
| Trichloroethylene | 88.5 |
| Sodium di-methylamyl sulphosuccinate | 5.5 |
| Water | 6 |

EXAMPLE 7

|  | Parts by weight |
|---|---|
| Trichloroethylene | 86 |
| Sodium diamyl sulphosuccinate | 4 |
| Non-ionic agent * | 4 |
| Water | 6 |

*An ethylene oxide/nonyl phenol condensation product obtained using 13 moles of ethylene oxide per mole of nonyl phenol.

EXAMPLE 8

Compositions were prepared by dissolving a surface active agent in a stirred solvent at room temperature. The solvents and surface active agents employed are shown in Table 1 below. In each case the amount used of the surface active agent was 1% by weight based on the weight of the solvent. Distilled water was then added in small amounts to the stirred composition until the amount of water exceeded that which could be emulsified to give clear emulsions in the solvent. The results are shown in Table 1.

TABLE 1

| Solvent | Percent w./w. water emulsified (max.) | |
|---|---|---|
|  | Sodium di-(methylamyl) sulphosuccinate | Sodium dinonyl sulphosuccinate |
| Chlorobromomethane ($CH_2Br_2Cl$) | 0.7 | 0.4 |
| Trichlorobromomethane ($CCl_3Br$) | 0.8 | 0.4 |
| n-Butyl bromide | 0.7 | 0.3 |
| 2,3-dibromobutane | 1.0 | 0.2 |

EXAMPLE 9

This example demonstrates the effect of varying the sulphosuccinate on the emulsifying ability of a trichloroethylene-based composition.

Compositions were prepared by dissolving each of the sulphosuccinates shown in Table 2 separately in trichloroethylene. In each case the amount of the sulphosuccinate was 1% by weight based on the trichloroethylene. The maximum amount of water which could be emulsified in each composition was determined by adding distilled water to the stirred composition until the emulsion became cloudy. The results are shown in Table 2.

TABLE 2

| Sulphosuccinate | Amount (percent w./w.) | Max. water emulsified (percent w./w.) |
|---|---|---|
| Sodium di-isobutyl | 1 | 0.25 |
| Sodium diamyl | 1 | 1 |
| Sodium di(methylamyl) | 1 | 1 |
| Sodium diheptyl | 1 | 0.4 |
| Sodium dioctyl | 1 | 0.5 |
| Sodium dionyl | 1 | 0.5 |

These results clearly demonstrate the superior emulsifying ability of compositions containing sodium diamyl sulphosuccinate or sodium di(methylamyl) sulphosuccinate.

What we claim is:

1. A composition consisting essentially of (A) a bromo or chlorohydrocarbon solvent selected from the group consisting essentially of trichloroethylene, perchloroethylene, 1,1,1-trichloroethane, beta-trichloroethane, cis and trans dichloroethylenes, methylene dichloride, 2,3-dibromobutane, n-butyl bromide, chlorobromomethane and bromotrichloromethane, (B) at least 0.5% and up to 10% by weight of a surface active agent comprising an alkali metal, ammonium or amine salt of the monosulphonic acid derivative of a diester of a succinic acid and (C) 0 to 50% of water, and wherein the remainder of the composition is essentially the said solvent and the said solvent is contained in the composition in an amount of at least 40% by weight.

2. A composition as claimed in claim 1 which is a water-in-oil emulsion.

3. A composition as claimed in claim 1 wherein the solvent is trichloroethylene.

4. A composition as claimed in claim 1 wherein the salt is soluble in the solvent.

5. A composition as claimed in claim 1 wherein the esterfying groups of the salt are alkyl groups containing from 4 to 13 carbon atoms.

6. A composition as claimed in claim 5 wherein the eesterifying groups are alkyl groups containing 5 or 6 carbon atoms.

7. A composition as claimed in claim 6 wherein the salt is sodium di(methylamyl) sulphosuccinate.

8. A composition as claimed in claim 1 wherein the amine of the salt is a primary, secondary or tertiary alkyl amine.

9. A composition as claimed in claim 2 which contains distilled or de-ionised water.

10. A composition as claimed in claim 1 which contains a stabiliser to inhibit metal decomposition of the halogenated hydrocarbon solvent.

11. A method of cleaning articles which comprises immersing them in a composition as claimed in claim 2.

12. A method of drying articles which comprises immersing them in a composition as claimed in claim 1.

13. A method of treating articles as claimed in claim 11 wherein the treatment is followed by rinsing in a pure halogenated hydrocarbon solvent.

References Cited

UNITED STATES PATENTS

| | | | |
|---|---|---|---|
| 3,577,348 | 5/1971 | Clementson | 252—171 |
| 2,028,091 | 1/1936 | Jaeger | 252—161 |
| 2,509,197 | 5/1950 | Borus et al. | 252—Dig. |
| 3,433,746 | 3/1969 | Knaggs et al. | 252—171 |

OTHER REFERENCES

John: "Modern Polishes & Specialties," Chem. Publ. Co. (1947), pp. 288–289.

Aerosol Wetting Agents (1941), American Cyanamid & Chem. Corp., pp. 3, 46, 47, 66.

WILLIAM E. SCHULZ, Primary Examiner

U.S. Cl. X.R.

134—2, 40; 252—353, Dig. 10